United States Patent
Jung

(10) Patent No.: US 7,512,687 B2
(45) Date of Patent: Mar. 31, 2009

(54) SYSTEM AND METHOD FOR ASSIGNING A MOBILE IP TO A MOBILE NODE

(75) Inventor: Tae-Sung Jung, Sangju-shi (KR)

(73) Assignee: Samsung Electronics Co., Ltd (KR)

( * ) Notice: Subject to any disclaimer, the term of this patent is extended or adjusted under 35 U.S.C. 154(b) by 772 days.

(21) Appl. No.: 10/002,534

(22) Filed: Nov. 1, 2001

(65) Prior Publication Data

US 2002/0129150 A1      Sep. 12, 2002

(30) Foreign Application Priority Data

Nov. 1, 2000      (KR)      ................................ 2000-64643

(51) Int. Cl.
*G06F 15/16*      (2006.01)

(52) U.S. Cl. ...................... 709/227; 709/249

(58) Field of Classification Search ................ 709/227, 709/230, 245, 249; 370/401, 469
See application file for complete search history.

(56) References Cited

U.S. PATENT DOCUMENTS

| | | | | |
|---|---|---|---|---|
| 6,016,318 | A * | 1/2000 | Tomoike | 370/401 |
| 6,560,217 | B1 * | 5/2003 | Peirce et al. | 370/351 |
| 6,684,256 | B1 * | 1/2004 | Warrier et al. | 709/238 |
| 6,707,809 | B1 * | 3/2004 | Warrier et al. | 370/351 |
| 6,738,362 | B1 * | 5/2004 | Xu et al. | 370/329 |
| 6,751,729 | B1 * | 6/2004 | Giniger et al. | 713/153 |
| 6,772,210 | B1 * | 8/2004 | Edholm | 709/226 |
| 6,915,325 | B1 * | 7/2005 | Lee et al. | 709/202 |
| 6,915,345 | B1 * | 7/2005 | Tummala et al. | 709/225 |
| 6,963,582 | B1 * | 11/2005 | Xu | 370/466 |
| 6,978,317 | B2 * | 12/2005 | Anantha et al. | 709/249 |
| 6,985,464 | B2 * | 1/2006 | Harper et al. | 370/331 |
| 7,068,640 | B2 * | 6/2006 | Kakemizu et al. | 370/349 |

(Continued)

FOREIGN PATENT DOCUMENTS

JP      10-023068      1/1998

(Continued)

OTHER PUBLICATIONS

International Search Report, International Application No. PCT/KR01/01853, Feb. 22, 2002.

(Continued)

*Primary Examiner*—Douglas B Blair
(74) *Attorney, Agent, or Firm*—The Farrell Law Firm, PC

(57) ABSTRACT

Disclosed is a system providing a VPN service by connecting a VPN (virtual Private Network) to a mobile communication network. A home agent (HA) stores location information of a mobile node (MN) and information on whether the MN is registered in the VPN. A foreign agent (FA) transmits a location registration request message to the HA by receiving location registration information of the MN, and transmits data to an ISP (Internet Service Provider) router in the same subnet upon receiving a VPN service request. A server provides the VPN service and a router network connects the VPN to the FA. The router network includes a server for searching an edge IP router in the network using an address of the FA. The HA prevents an MN from accepting a call request received from a specific node in an IP network while the MN is performing a VPN service.

11 Claims, 17 Drawing Sheets

U.S. PATENT DOCUMENTS

| | | | |
|---|---|---|---|
| 7,174,018 B1 * | 2/2007 | Patil et al. | 380/258 |
| 7,426,202 B2 * | 9/2008 | Warrier et al. | 370/338 |
| 7,426,213 B2 * | 9/2008 | Xu et al. | 370/401 |
| 2004/0240441 A1 * | 12/2004 | Sriram | 370/389 |

FOREIGN PATENT DOCUMENTS

| | | |
|---|---|---|
| JP | 10-032610 | 2/1998 |
| JP | 11-55326 A | 2/1999 |

OTHER PUBLICATIONS

Malkin, "Dial-in Virtual Private Networks Using Layer 3 Tunneling", 1997 IEEE, pp. 555-561.

* cited by examiner

| TYPE | RESERVED |
|---|---|
| VPN SERVER ADDRESS | |

NEW EXTENSION FOR VPN SERVICE, USED IN REGISTRATION REQUEST MESSAGE

FIG. 5

| TYPE | RESERVED |
|---|---|
| VPN-ID | |
| SPECIFIC ADDRESS FOR VPN SERVICE | |
| ISP EDGE ROUTER ADDRESS | |

NEW EXTENSION FOR VPN SERVICE, USED IN REGISTRATION REPLY MESSAGE

| 0 | 1 | 2 | 3 |
|---|---|---|---|
| 0 1 2 3 4 5 6 7 | 8 9 0 1 2 3 4 5 | 6 7 8 9 0 1 2 3 4 5 | 6 7 8 9 0 1 |
| TYPE | RESERVED | AUTHENTICATION LIFETIME | |
| MOBILE NODE ADDRESS | | | |
| CARE-OF-ADDRESS | | | |
| IDENTIFICATION | | | |

AUTHENTICATION REQUEST MESSAGE FOR MOBILE NODE (HA → ISP EDGE ROUTER 1)

FIG. 8

| 0 | 1 | 2 | 3 |
|---|---|---|---|
| 0 1 2 3 4 5 6 7 | 8 9 0 1 2 3 4 5 | 6 7 8 9 0 1 2 3 4 5 | 6 7 8 9 0 1 |
| TYPE | CODE | VPN LIFETIME | |
| MOBILE NODE ADDRESS | | | |
| CARE OF ADDRESS | | | |
| ISP EDGE ROUTER A ADDRESS | | | |
| IDENTIFICATION | | | |

AUTHENTICATION REQUEST MESSAGE (ISP EDGE ROUTER 1 → ISP SERVER)

| 0 | 1 | 2 | 3 |
|---|---|---|---|
| 0 1 2 3 4 5 6 7 | 8 9 0 1 2 3 4 5 | 6 7 8 9 0 1 2 3 4 5 6 7 8 9 0 1 |
| TYPE | CODE | VPN LIFETIME |
| VPN-ID | | |
| SPECIFIC ADDRESS FOR VPN SERVICE | | |
| ISP EDGE ROUTER B ADDRESS | | |
| IDENTIFICATION | | |
| AUTHENTICATION REPLY MESSAGE (ISP EDGE ROUTER 1 → HA) | | |

| TYPE | CODE | VPN LIFETIME |
|---|---|---|
| MOBILE NODE ADDRESS | | |
| CARE-OF-ADDRESS | | |
| IDENTIFICATION | | |

AUTHENTICATION REPLY MESSAGE (ISP SERVER → ISP EDGE ROUTER 1)

FIG. 11

| TYPE | CODE | VPN LIFETIME |
|---|---|---|
| MOBILE NODE ADDRESS | | |
| CARE-OF-ADDRESS | | |
| IDENTIFICATION | | |

AUTHENTICATION REPLY MESSAGE (ISP EDGE ROUTER 2 → ISP EDGE ROUTER 1)

SYSTEM AND METHOD FOR ASSIGNING A MOBILE IP TO A MOBILE NODE

PRIORITY

This application claims priority to an application entitled "System and Method for Assigning Mobile IP to Mobile Node" filed in the Korean Industrial Property Office on Nov. 1, 2000 and assigned Ser. No. 2000-64643, the contents of which are hereby incorporated by reference.

BACKGROUND OF THE INVENTION

1. Field of the Invention

The present invention relates generally to a system and method for assigning a mobile IP (Internet Protocol), and in particular, to a system and method for assigning a mobile IP to a mobile node.

2. Description of the Related Art

In general, a mobile node (MN) is used for a voice (circuit) call or a data service for its mobility. Further, due to its mobility, the mobile node is not limited to a single location. Therefore, a user of the mobile node can be provided with a data service, such as a mobile Internet service, even while moving from place to place.

Recently, active research has been carried out on a system and method for providing stable services. In order to provide a stable data service to the mobile node while securing the mobility, it is necessary to assign a mobile IP to the mobile node. To this end, a method for assigning a mobile IP to the mobile node is in development.

FIG. 1 illustrates a network configuration for assigning a mobile IP to a mobile node. A network configuration and a location registration process for assigning a mobile IP to a mobile node will be described with reference to FIG. 1. A mobile node (MN) 10 transmits a location registration request signal to a foreign agent (FA) 20, in an initialization process after power on or upon receipt of a location registration request signal. However, since the MN 10 has the mobility as stated above, the MN 10, although it is registered in a Korea-based service provider, transmits the location registration request signal even in a non-registered country, for example, the United States. If a service agreement has been made between the mobile communication service providers, the location registration request is available. A detailed description of this will be given with reference to FIG. 1.

The MN 10 wirelessly sends a location registration request signal to the FA 20. The FA 20 can detect an address of a home agent (HA) 30 included in the location registration request signal received from the MN 10. Thus, the FA 20 performs location registration on the MN 10 in reply to the location registration request signal from the MN 10. The FA 20 transmits a location registration request signal for the MN 10 to the HA 30 through a network 25, along with an address of the FA 20. The HA 30 then stores the address of the FA 20 where the MN 10 is located. That is, the HA 30 stores COA (Care-of-Address) of the FA 20 to which the MN 10 belongs. Thereafter, the HA 30 sends a location registration reply signal to the FA 20 in response to the location registration request signal received from the MN 10 through the FA 20. Through this process, the location registration is performed on the MN 10. The location of the MN 10 must be registered in the HA 30, in order that the MN 10 might receive data from a correspondent node (CN) 40. A description of the communication performed in the network will be made with reference to FIG. 2.

FIG. 2 illustrates a network configuration for assigning a mobile IP to a mobile node. A description will be made of a process for exchanging data between the CN 40 and the MN 10 in the case when the location of the MN 10 has been registered in the HA 30 through the process of FIG. 1. A network 25a between the FA 20 and the HA 30, a network 25b between the HA 30 and the CN 40 and a network 25c between the FA 20 and the CN 40 can be identical to or different from one another. Herein, the networks will be assumed to be an IP network.

The CN 40 is a computer for transmitting data to an Internet server or the MN 10. To transmit data to the MN 10, the CN 40 sends the data to the HA 30 through the IP network 25b. The HA 30 stores therein the address of the FA 20 where the MN 10 is located, then reads the address of the FA 20 and sends the data to the FA 20 through the IP network 25a. The FA 20 then transmits the data to the MN 10. The data transmitted to the MN 10 includes an address of the CN 40. To transmit data to the CN 40, the MN 10 sends data to the FA 20. The FA 20 then transmits the data directly to the CN 40 without passing through the path of the FA20→the HA 30→the CN 40. This is because the MN 10 sends a data transmission request using a destination address. Therefore, the data transmission path is different from the data reception path.

Recently, as Internet service is used worldwide at a low service rate, communication networks tend to accommodate Internet service. Further, active research has been carried out on a private network capable of accommodating Internet service. Based upon this research, a study is being made on a virtual private network (VPN) in which service is not limited in location, and a method for assigning a mobile IP even in a non-registered area.

The private network can be divided into a dedicated WAN (Wide Area Network) and a dial network. The dedicated WAN connects one site to another site with a permanent line, while the dial network, such as a PSTN (Public Switched Telephone Network), connects a line through dialing when necessary.

A configuration of a network to which a VPN is connected through a router based on the IP, and a data exchanging process will be described with reference to FIG. 3. In FIG. 3, an IP backbone is connected to routers, and in particular, ISP (Internet Service Provider) routers 120, 130 and 140 become edge routers to be connected to CPE (Customer Promise Equipment) routers 150, 160 and 170. IP tunnels are formed among the ISP routers 120, 130 and 140 in the IP network 100, to exchange data. In addition, stub links are formed between the ISP routers and the CPE routers. As occasion demands, a backup link is formed between CPE router 160 and the ISP router 120, the routers existing in different locations, and a backdoor link is formed between the CPE routers 150 and 170. Through the network configuration, the Internet service is provided and a voice call is performed.

However, since the network shown in FIG. 3 is not interlinked with the network shown in FIG. 2, the MN 10 cannot be provided with the stable service. That is, when the MN 10 is registered in the VPN, it cannot be simultaneously applied to the VPN and the mobile communication network while maintaining its mobility. In other words, it is not easy to combine the network of FIG. 2 for performing the mobile service of the mobile communication network with a network of FIG. 3 for performing the IP service. In addition, although the networks are combined with each other, since the MN 10 has the mobility, it passes through different IP routers each time it moves. Therefore, the CPE routers must be modified, making it difficult to assign a mobile IP to the MN 10. That is, although the MN 10 is simultaneously applied to the above-stated two networks, it is not possible to assign the mobile IP to the MN 10 to perform the Internet service.

SUMMARY OF THE INVENTION

It is, therefore, an object of the present invention to provide a system and method for assigning a mobile IP to an MN and exchanging data through an IP network.

It is another object of the present invention to provide a system and method for assigning a mobile IP to an MN while securing mobility, and stably exchanging data with an IP network through the assigned mobile IP.

It is further another object of the present invention to provide an apparatus and method for forming a virtual private network (VPN) through an IP network, and providing a service between an MN and the VPN.

To achieve the above and other objects, there is provided a system for providing a VPN service by connecting a VPN to a mobile communication network. A home agent (HA) stores location information of a mobile node (MN) and information on whether the MN is registered in the VPN. A foreign agent (FA) transmits a location registration request message to the HA by receiving location registration information of the MN, and transmits data to an ISP (Internet Service Provider) router in the same subnet upon receiving a VPN service request. A server provides the VPN service and a router network connects the VPN to the FA.

Preferably, the router network includes a server for searching an edge IP router in the network using an address of the FA.

Preferably, the HA prevents an MN from accepting a call request received from a specific node in an IP network while the MN is performing a VPN service.

BRIEF DESCRIPTION OF THE DRAWINGS

The above and other objects, features and advantages of the present invention will become more apparent from the following detailed description when taken in conjunction with the accompanying drawings in which:

FIG. 5 illustrates a format of a location registration request message for the VPN service transmitted from the MN according to an embodiment of the present invention;

FIG. 6 illustrates a message format used by a VPN server in informing a home agent (HA) whether the VPN service is available;

FIG. 7 illustrates a message format created by the HA to transmit a received VPN service request to the VPN server;

FIG. 8 illustrates a message format transmitted from an ISP (Internet Service Provider) router to an ISP server;

FIG. 9 illustrates a message format transmitted from the ISP router to the HA;

FIG. 10 illustrates a message format transmitted from the ISP server to the ISP router;

FIG. 11 illustrates a message format exchanged between ISP routers;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
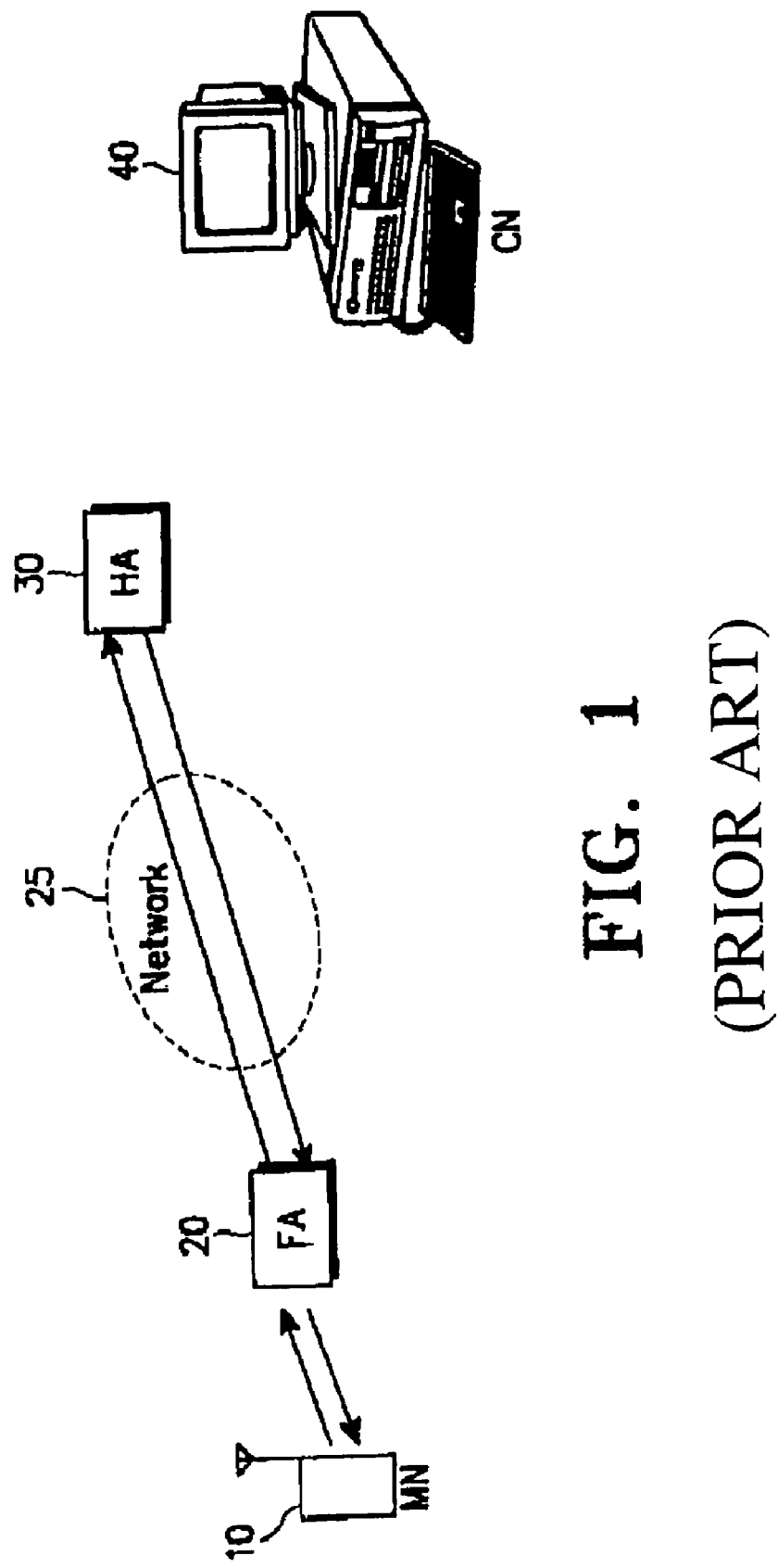
FIG. 1 illustrates a network configuration for assigning a mobile IP to a mobile node.
Figure 2:
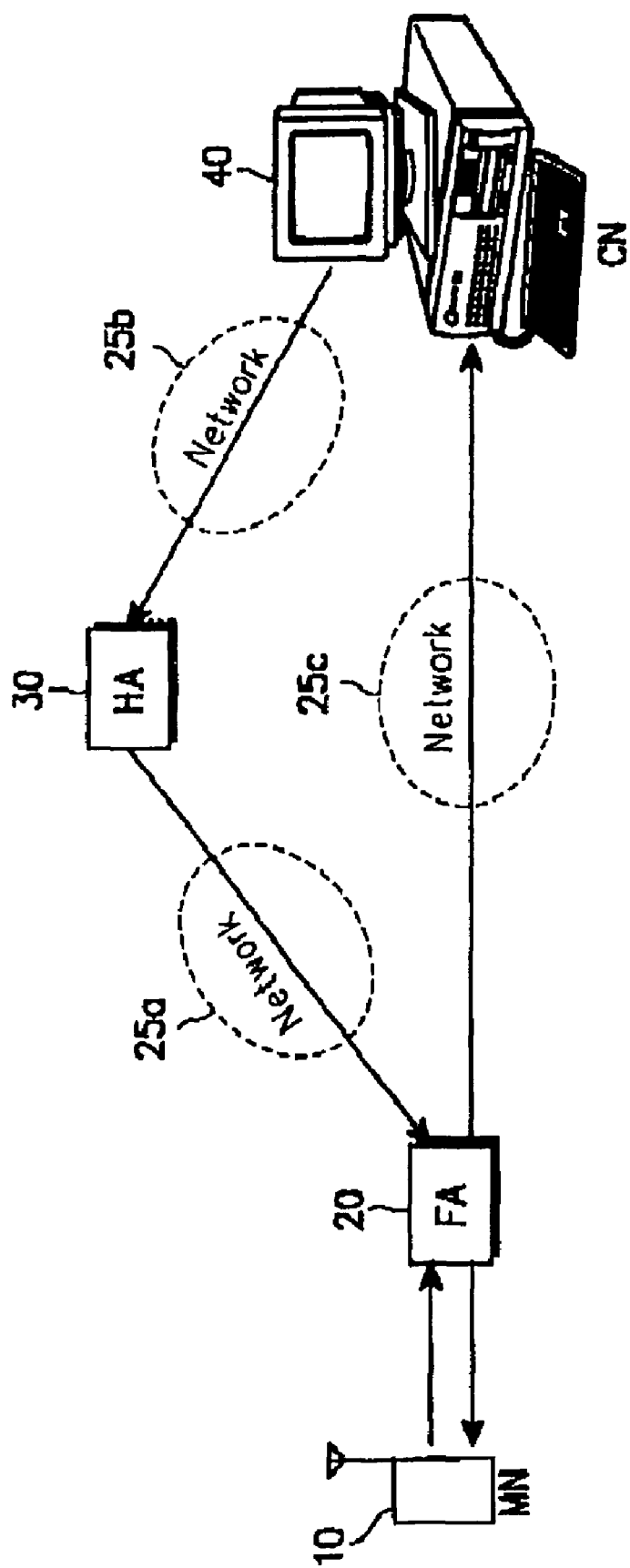
FIG. 2 illustrates a method for performing communication in a network for assigning a mobile IP to a mobile node.
Figure 3:
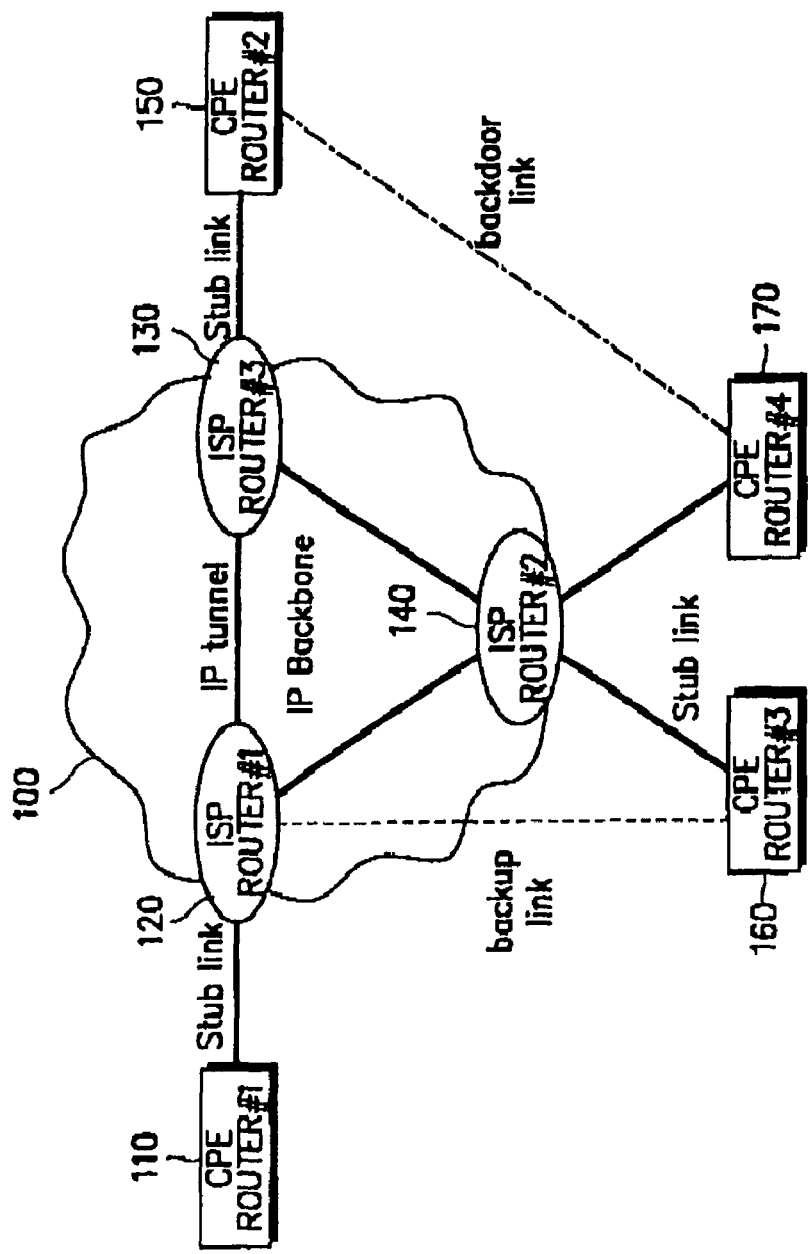
FIG. 3 illustrates a configuration of a network to which a virtual private network (VPN) is connected through a router based on the IP.
Figure 4:
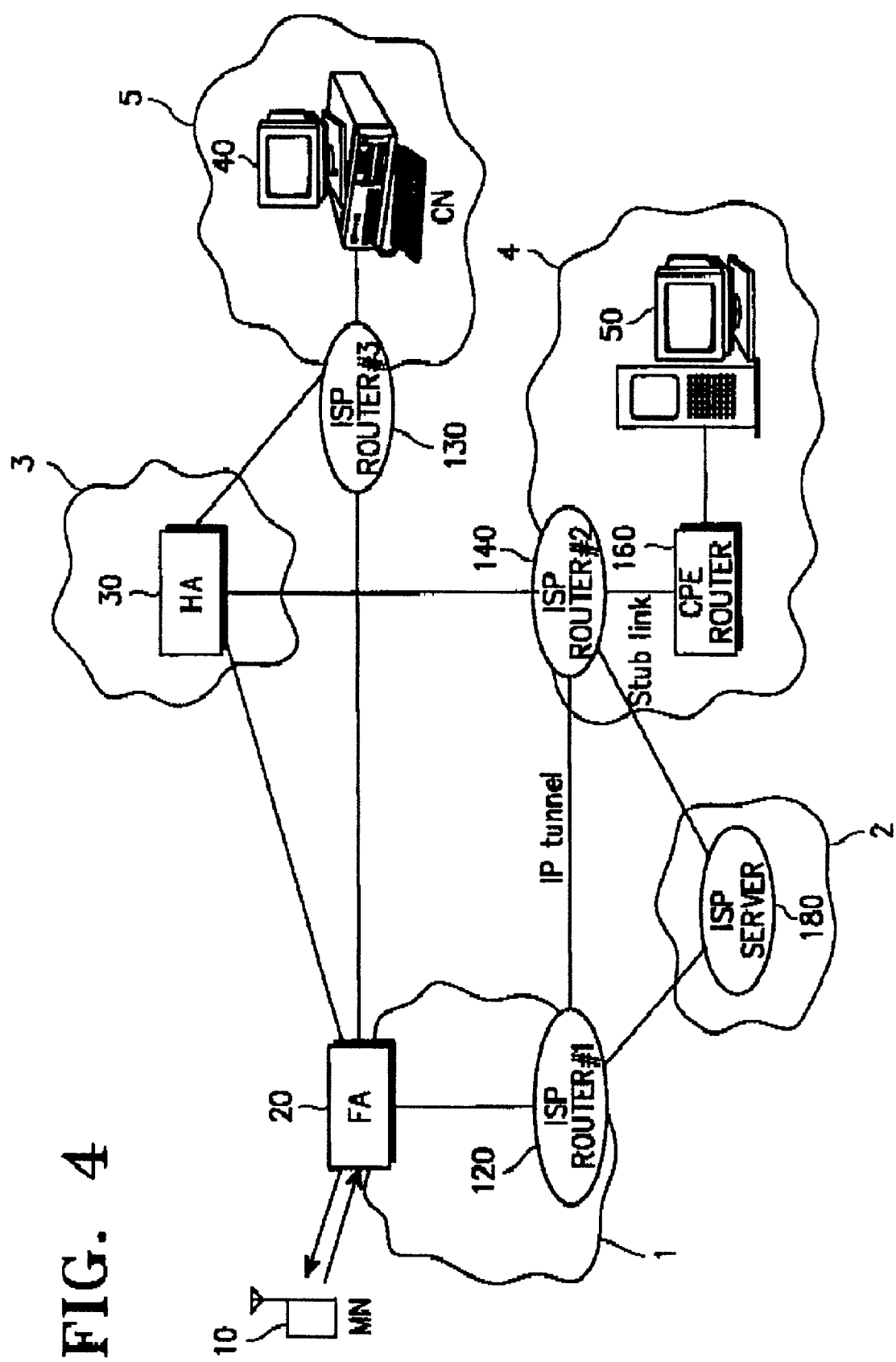
FIG. 4 illustrates a network configuration for constructing a VPN by assigning a mobile IP to a mobile node (MN) according a preferred embodiment of the present invention.

FIG. 4 illustrates a network configuration for constructing a virtual private network (VPN) by assigning a mobile IP to a mobile node (MN) according to a preferred embodiment of the present invention. The network configuration and an operation of each node according to an embodiment of the present invention will be described with reference to FIG. 4.

Reference will first be made to an operation of a VPN service. The FA 20 recognizes presence of a first ISP router 120 located in the same subnet, and at the same time, the first ISP router 120 should also recognize the presence of the FA 20. In this case, to receive the VPN service, the MN 10 sends a separate location registration request message for the VPN service to the HA 30 through the FA 20. In the location registration process, the MN 10 specifically requests to be provided with the VPN service. Therefore, the invention defines a message format shown in FIG. 5 to accommodate such data specified by the MN 10.

FIG. 5 illustrates a format of a location registration request message for the VPN service transmitted from the MN 10 according to an embodiment of the present invention. For the VPN location registration, the MN 10 should transmit an address of a VPN server 50 to the FA 20. Upon receiving the address of the VPN server 50, the FA 20 stores the received address therein, and at the same time, transmits a VPN service request message to the HA 30, thus performing location registration.

In addition, upon receiving a location registration reply message from the HA 30 via the FA 20, the MN 10 stores an ID of the VPN (VPN-ID) in its memory. Therefore, the MN 10 can transmit data using the VPN-ID. When the first ISP router 120 assigns a specific IP address for the VPN service, the MN 10 stores the assigned IP address instead of the mobile IP for future use.

Upon receiving the location registration request message for the VPN service of FIG. 5 from the MN 10, the FA 20 detects a home address of the home agent from the received location registration request message and transmits the detected home address to the HA 30. Further, upon receiving a location registration reply message from the HA 30, the FA 20 stores the address temporarily assigned to the MN 10 and an address of the first ISP router 120 provided from the HA 30. By doing so, it is possible to correctly deliver the data transmitted from/to the MN 10. Further, the FA 20 separately transmits the data provided from the CN 40 connected to the Internet and the VPN service data to the MN 10.

Upon receiving data from the MN 10, the FA 20 determines whether the received data is VPN service data or data to be transmitted to another CN in the Internet. As the result of the determination, if the received data is data to be transmitted to another CN in the Internet, the FA 20 transmits the received data to the corresponding CN. Otherwise, if the received data is the VPN service data, the FA 20 transmits the received data to the first router 120 to perform the VPN service.

When the HA 30 initially receives information on the MN 10, it registers the VPN service desired by the MN 10. That is, the MN may request or not request the VPN service. If the MN 10 requests two different VPN services, the HA 30 stores the corresponding data. In addition, if the MN 10 desires the VPN service, it stores the data along with an address of an ISP router connected to a server processing the VPN service. This data is stored at a time when the user purchases the MN or when he or she is first provided with the VPN service. Shown in Table 1 is an example of a data format stored in the HA 30 according to the present invention, when the MN 10 is registered in one VPN service.

TABLE 1

| MIN | IP | VPN Address | FA Address |
|---|---|---|---|
| 111-1111 | 001.001.001.001 | 123.123.123.123 | 321.321.321.321 |
| ... | ... | ... | ... |

As shown in Table 1, the HA 30 must have an MIN (Mobile Identification Number) of the MN 10, a mobile IP, a VPN address and an FA address where the registered location of the MN 10 is to be stored.

In addition, upon receiving a location registration request message from the MN 10, the HA 30 transmits the received location registration request message to a second ISP router 140 performing the VPN service, using the VPN address of Table 1. Based on location information of the MN 10, the second ISP router 140 can determine the ISP router in an area where the MN 10 is located. This process will be described in more detail when a description of the second ISP router 140 and an ISP server 180 is made.

Upon receiving the location registration request message for the VPN service from the MN 10, the HA 30 sends a service availability inquiry message inquiring whether the service is available, to the second ISP router 140. The second ISP router 140 sends the received message to the VPN server 50 (a server providing the VPN service) via the CPE router 160. The VPN server 50 determines whether the VPN service is available, creates a message as illustrated in FIG. 6 according to the determined results, and then transmits the created message to the HA 30 through the CPE router 160 and the second ISP router 140.

FIG. 6 illustrates a message format used by the VPN server 50 in informing the HA 30 whether the VPN service is available. As illustrated in FIG. 6, the message is comprised of a VPN-ID for performing the VPN service, an address of the second ISP router 140 connected to the VPN server 50, and a specific address to be used by the MN 10 during the VPN service. Upon receiving this message, the HA 30 creates a location registration reply message and transmits the created location registration reply message to the MN 10 via the FA 20 along with the received message.

Further, upon receiving a location registration request message from the MN 10 via the FA 20, the HA 30 transmits a message of FIG. 7 to the second ISP router 140, an edge ISP router of the VPN server 50 performing the VPN service.

FIG. 7 illustrates a message format created by the HA 30 to transmit a received VPN service request to the VPN server 50. Referring to FIG. 7, the message includes an authentication lifetime, a mobile node address of the MN 10, and a care-of-address (COA) of the FA 20 where the MN 10 is located. The message further includes an identification (ID) for exchanging signaling with the second ISP router 140 intervening between the HA 30 and the VPN server 50.

Further, upon receiving a VPN service reply signal of FIG. 6 from the second ISP router 140, the HA 30 includes the received signal in the message of FIG. 6 and transmits the message to the FA 20 along with the location registration reply message. While the MN 10 is performing the VPN service after the location registration, the HA 30 cannot accommodate the Internet service.

A message for determining whether the VPN service is available can be added to the location registration reply message, as shown in FIG. 6. As illustrated in FIG. 6, the message includes a message type, a VPN-ID, an address for the VPN service, and an edge ISP router address. The edge ISP router corresponds to the second ISP router 140 of FIG. 4.

If the VPN service is available, the HA 30 periodically transmits the message so that the routers may update the lifetime when the MN 10 maintains the same FA 20. In this way, the routers continuously maintain information on the edge router where the MN 10 is located. If such a signal fails to arrive until an update time, the routers delete the data.

When the MN 10 is initially registered in the HA 30 to be provided with the VPN service, the VPN server 50 receives information on the MN 10 from the HA 30 and stores the received information along with the address of the HA 30. Such information should be updated periodically. Therefore, the VPN server 50 authenticates whether the VPN service is available, using the IP address of the MN included in the message received from the HA 30. If it is authenticated that the VPN service is available, the second ISP router 140 transmits a message for searching the first ISP router 120 to the ISP server 180, based on the address of the FA 20 where the MN 10 is located, received from the HA 30.

This message is shown in FIG. 8, and comprised of a message type, an authentication lifetime, a mobile node address of the MN 10 (or an address of the FA 20), a COA associated with the mobile node address, and an address of the second ISP router 140. In FIG. 8, an identification field is used to determine whether a reply is received from the ISP server 180.

If there is no reply from the routers in the IP network within the authentication lifetime, the ISP server 180 transmits a message of FIG. 9 to the HA 30 to inform that there is no ISP router in the corresponding area. Even when informed of the absence of the ISP router by the ISP server 180, the HA 30 transmits the message of FIG. 9 in the same manner. Unlike this, even when an authentication message is received, the ISP server 180 transmits the message of FIG. 9 to the HA 30. In this case, however, code information is changed. That is, when all of the code bits of FIG. 9 are set to '0', it means that there is no ISP server. However, when the code has a specific value, it indicates an IP router having the specific value. In addition, a VPN lifetime field of FIG. 9 indicates that information on the MN 10 is maintained only for the lifetime. Therefore, the ISP routers should update the lifetime by periods. To this end, the HA 30 periodically transmits the message to the ISP routers, as stated above.

In addition, the specific address for the VPN service indicates an address to be used when performing the VPN service. This field is filled with corresponding data when the second ISP router 140 is required. That is, it is optional whether to fill this field with data.

The ISP server 180 has information on every ISP router. That is, when ISP routers operated by different service is provided in a specific area, the ISP server 180 should manage information on all of these ISP routers. This is because there is a case where the MN 10 belongs to the ISP router providing the VPN service when a specific VPN is used. In addition, since the ISP router does not recognize an ISP router of another service provider, the ISP server 180 should previously recognize all of the ISP routers operated by other service providers. Therefore, although the MN 10 moves to a certain area, the ISP server 180 connects with the ISP router in the area for the VPN service.

That is, the ISP server 180 analyzes the COA of the message received from the second ISP router 140, and provides the analyzed results to the ISP router in the corresponding area. The ISP server 180 transmits the analyzed results along with information indicating that the MN 10 having the address of the HA 30 desires the VPN service. In this way, the ISP server 180 transmits the message received from the second ISP router 140 to the first ISP router 120. In addition, when the MN 10 is not registered in the ISP server 180, the ISP server 180 should assemble a message of FIG. 10 and transmit the message to the ISP router. The message shown in FIG. 10 is comprised of the above-stated fields, so the detailed description will not be provided.

The first ISP router 120 registers the MN 10 using the received message, to perform the normal service upon receipt of the VPN data. After registering the MN 10, the first ISP router 120 sends an authentication reply message to the second ISP router 140. The authentication reply message is assembled as illustrated in FIG. 11. In the message of FIG. 11, a code field indicates the contents of a normal or abnormal operation. Upon receiving this message, the first ISP router 120 also maintains information on the MN 10 only for the VPN lifetime. If the VPN lifetime value is '0', it means that the MN 10 has moved to another area. Therefore, like the second ISP router 140, the first ISP router 120 should update the VPN lifetime periodically while performing the VPN service.

When the signaling between the first ISP router 120 and the second ISP router 140 is normally completed, an IP tunnel is formed, for exchanging data between the two ISP routers.

Figure 12:
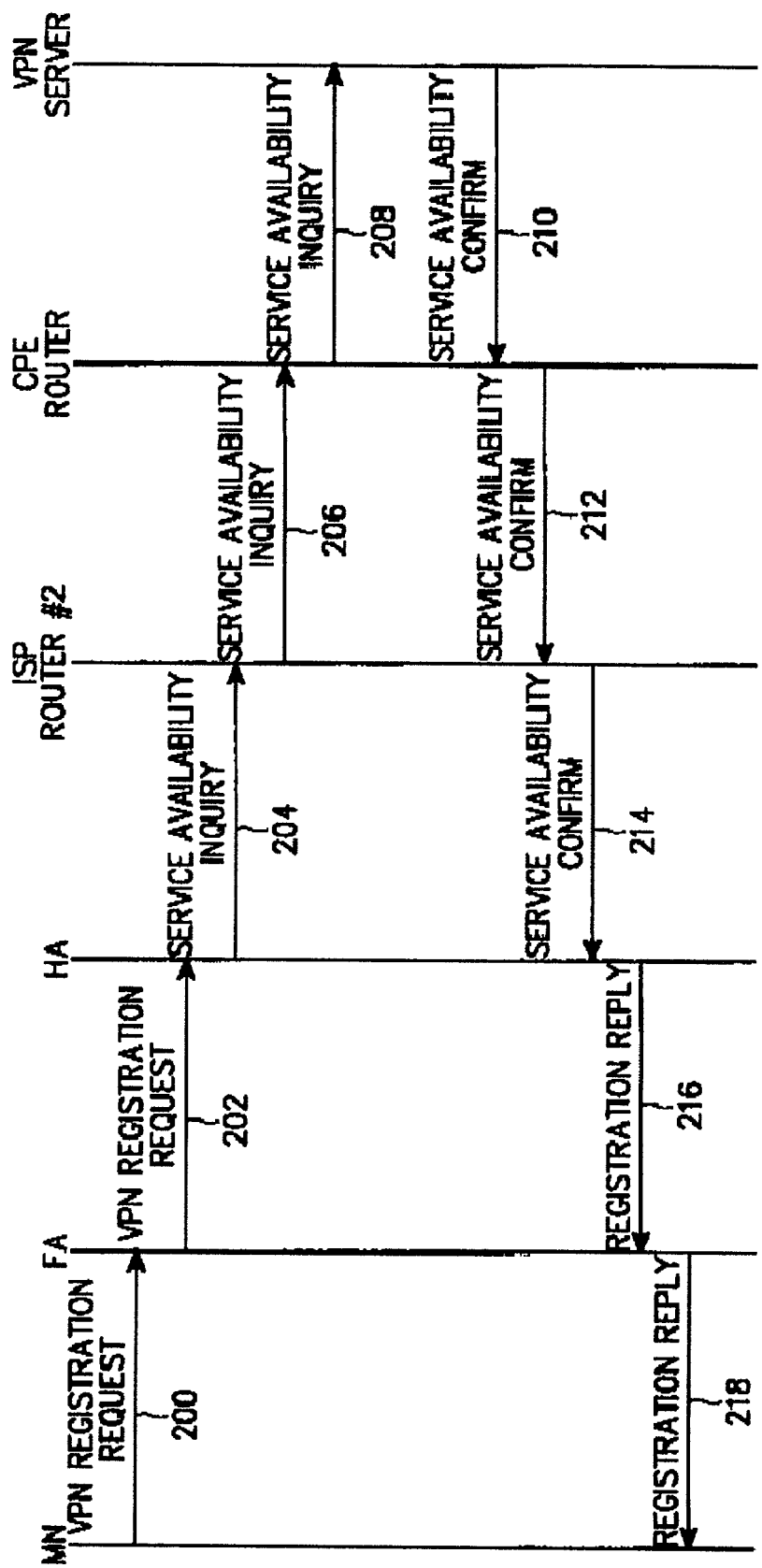
FIG. 12 illustrates a signal flow at each node upon receipt of a VPN service request from the MN according to a preferred embodiment of the present invention.

FIG. 12 illustrates a signal flow at each node upon receipt of a VPN service request from the MN 10 according to a preferred embodiment of the present invention. Referring to FIG. 12, in step 200, the MN 10 transmits a location registration request message for the VPN service to the FA 20. The location registration request message is transmitted along with an address of the VPN server 50 and an address of the HA 30. The FA 20 then detects the address of the HA 30 from the received location registration request message, and sends a location registration request for the VPN service to the HA 30 in step 202. The HA 30 then detects a location of the MN 10. That is, the HA 30 stores the address of the FA 20 where the MN 10 is located. Thereafter, in step 204, the HA 30 reads the data previously stored as illustrated in Table 1, and transmits a service availability inquiry signal to the second ISP router 140 corresponding to the address of the VPN server 50. Upon receiving the service availability inquiry signal, the second ISP router 140 transmits the service availability inquiry signal to the CPE router 160 connected through the stub link in step 206. The CPE router 160 then transmits the service availability inquiry signal to the VPN server 50 in step 208. Upon receiving the service availability inquiry signal, the VPN server 50 determines whether the VPN service is available, and then transmits a service availability confirm signal to the CPE router 160 according to the determined results in step 210. Thereafter, the CPE router 160 transmits the service availability confirm signal to the second ISP router 140 in step 212, and the second ISP router 140 transmits again the service availability confirm signal to the HA 30 in step 214. In this way, the HA 30 can determine whether the VPN service is available. Therefore, the HA 30 registers a state of the MN 10 as a VPN service state upon receipt of the location registration request signal. In this case, the service from the CN 40 is unavailable. That is, the Internet service is unavailable. In addition, upon failure to receive a reply within the authentication lifetime, the HA 30 determines that the VPN service is unavailable. Otherwise, upon receipt of a reply within the authentication lifetime, the HA 30 analyzes the received signal to determine whether VPN service is available. If it is not possible to perform the normal VPN service, the HA 30 informs the MN 10 of unavailability of the VPN service.

If the VPN service is available, the HA 30 transmits a location registration reply signal to the FA 20 in step 216, and at this time, the location registration request message can be transmitted along with the address of the VPN server 50, the address of the second ISP router 140, and the temporary VPN-ID for the case where the MN 10 is provided with the VPN service. Upon receiving the location registration reply signal, the FA 20 transmits the location registration reply message to the MN 10 in step 218, completing the location registration process in which the MN 10 performs the VPN service.

Figure 13:
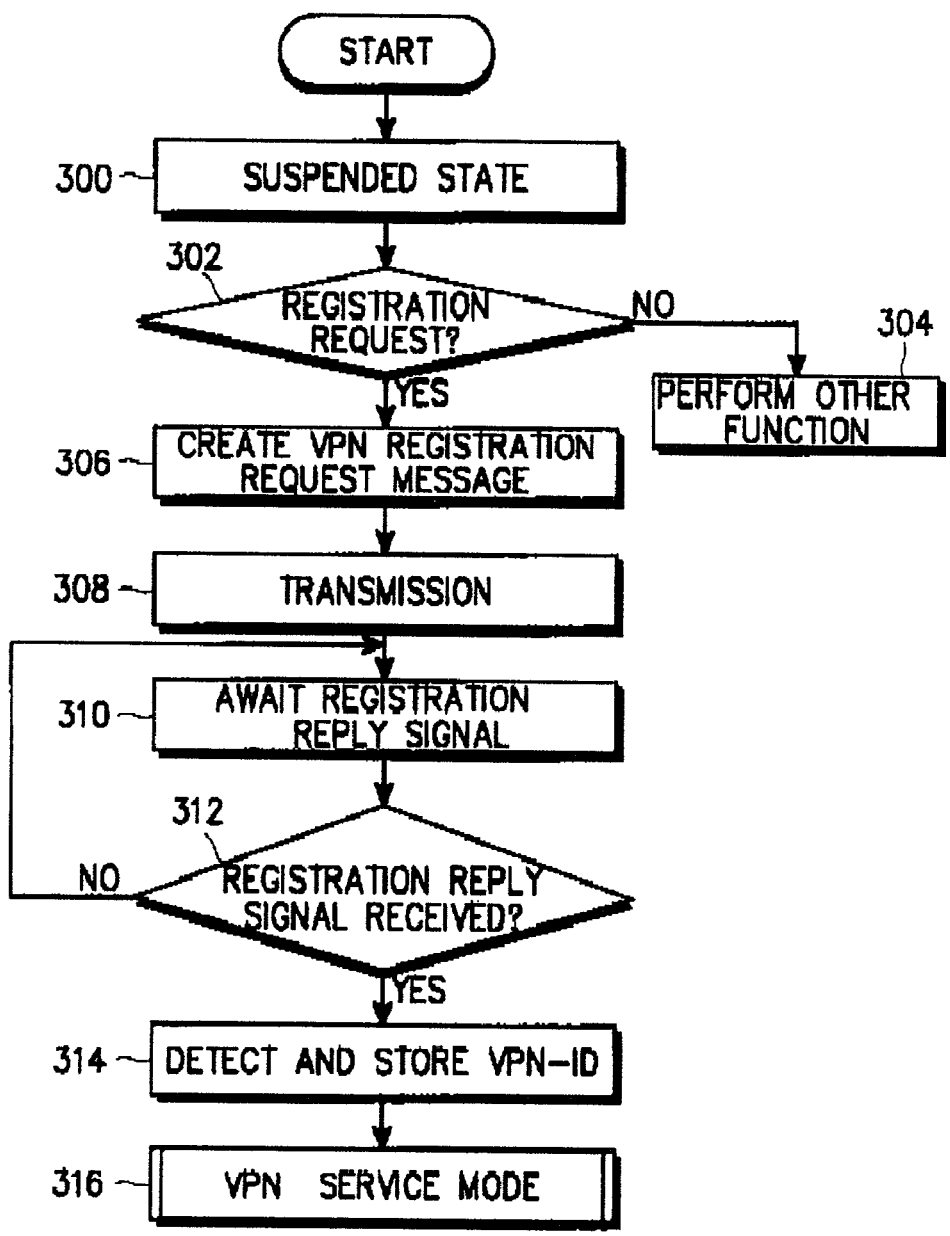
FIG. 13 illustrates a location registration request process for the VPN service performed by the MN according to an embodiment of the present invention.

FIG. 13 illustrates a location registration request process for the VPN service performed by the MN 10 according to an embodiment of the present invention. Referring to FIG. 13, if a specific key is input (pressed) in a suspended state of step 300, the MN 10 determines in step 302 whether the key input signal is a location registration request signal for the VPN service. If the key input signal is the location registration request signal for the VPN service, the MN 10 proceeds to step 306. Otherwise, the MN 10 proceeds to step 304 where it performs a function corresponding to the key input signal. The MN 10 creates a location registration request message for the VPN service in step 306, and then transmits the created location registration request message for the VPN service to the FA 20 in step 308. At the same time, the MN 10 creates an address of the HA 30 and an address of the VPN server 50, and transmits the created addresses along with the location registration request message for the VPN service. The MN 10 awaits a location registration reply signal in step 310, and determines in step 312 whether the location registration reply signal is received. Upon receiving the location registration reply signal in step 312, the MN 10 detects a VPN-ID from the received location registration reply message and stores the VPN-ID in step 314. When the location registration reply signal includes an address of the ISP router, the MN 10 stores the VPN-ID along with the address of the ISP router. That is, the MN 10 stores an address of the second ISP router 140 shown in FIG. 4 along with the VPN-ID, which is to be used temporarily. In step 316, the MN 10 enters a VPN service mode.

Figure 14:
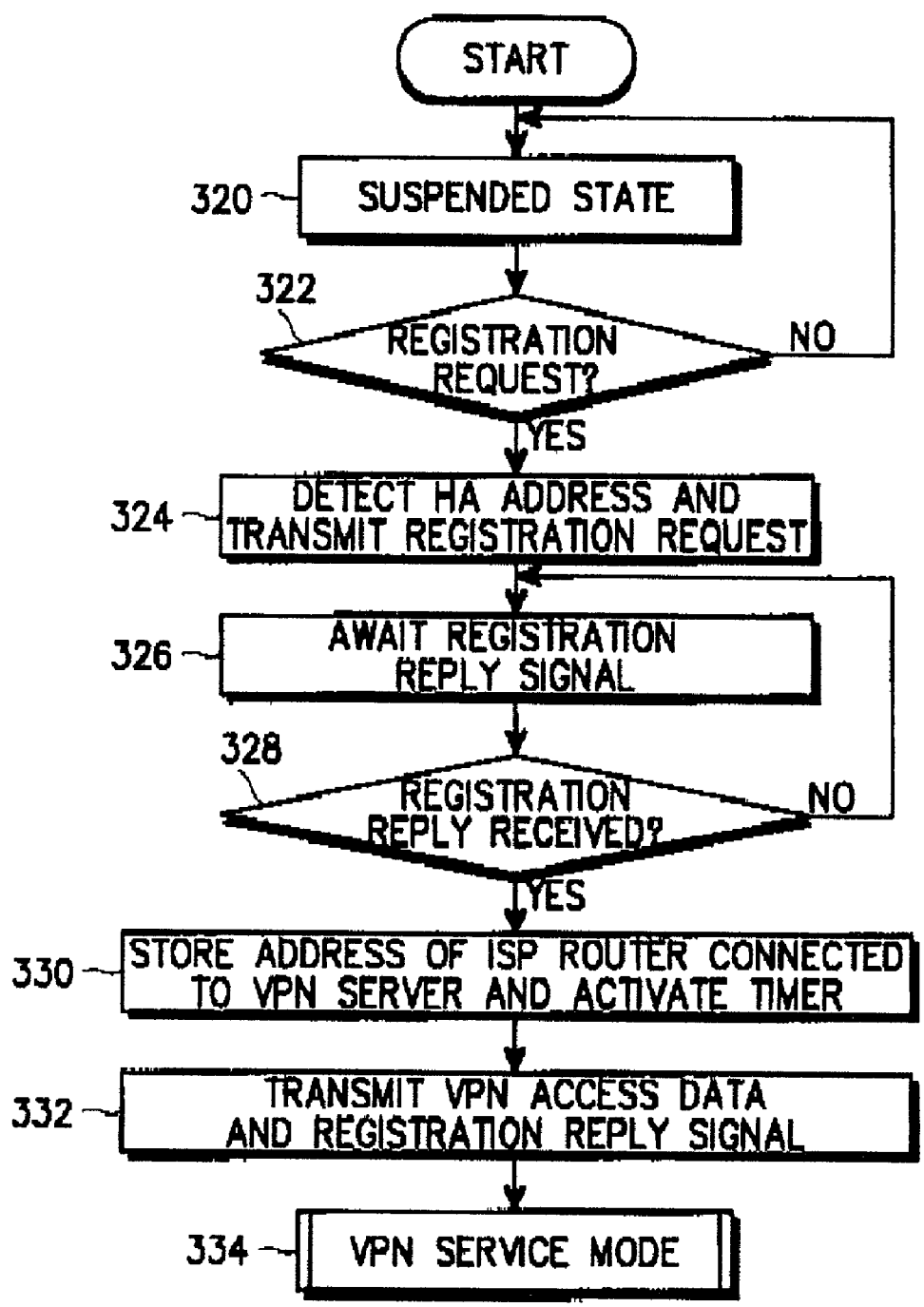
FIG. 14 illustrates a process for receiving the location registration request signal for the VPN service from the MN at the FA according to an embodiment of the present invention.

FIG. 14 illustrates a process for receiving the location registration request signal for the VPN service from the MN 10 at the FA 20 according to an embodiment of the present invention. Referring to FIG. 14, the FA 20 maintains the suspended state in step 320, and determines in step 322 whether the location registration request signal for the VPN service is received from the MN 10. Upon receiving the location registration request signal for the VPN service, the FA 20 detects the address of the HA 30 from the received location registration request signal, creates a location registration request message for the VPN service, and transmits the crated location registration request message for the VPN service to the detected address of the HA 30, in step 324. If the location registration request signal received from the MN 10 includes the address of the VPN server 50, the FA 20 transmits the location registration request message for the VPN service along with the address of the VPN server 50. Further, the FA 20 transmits its address information to the HA 30 along with the location registration request message for the VPN service. The FA 20 awaits arrival of a location registration reply signal for the VPN service from the HA 30 in step 326, and determines in step 328 whether the location registration reply signal for the VPN service is receive from the HA 30. Upon receiving the location registration reply signal for the VPN service, the FA 20 stores the address of the second ISP router 140 connected to the VPN server 50 and activates a timer set to a specific time, in step 330. The timer is used to limit a time period for which the MN 10 is registered in the FA 20. In step 332, the FA 20 transmits VPN access data and the location registration reply signal to the MN 10. The VPN access data transmitted to the MN 10 includes the whole data received from the HA 30. In step 334, the FA 20 enters the VPN service mode for the MN 10.

Figure 15:
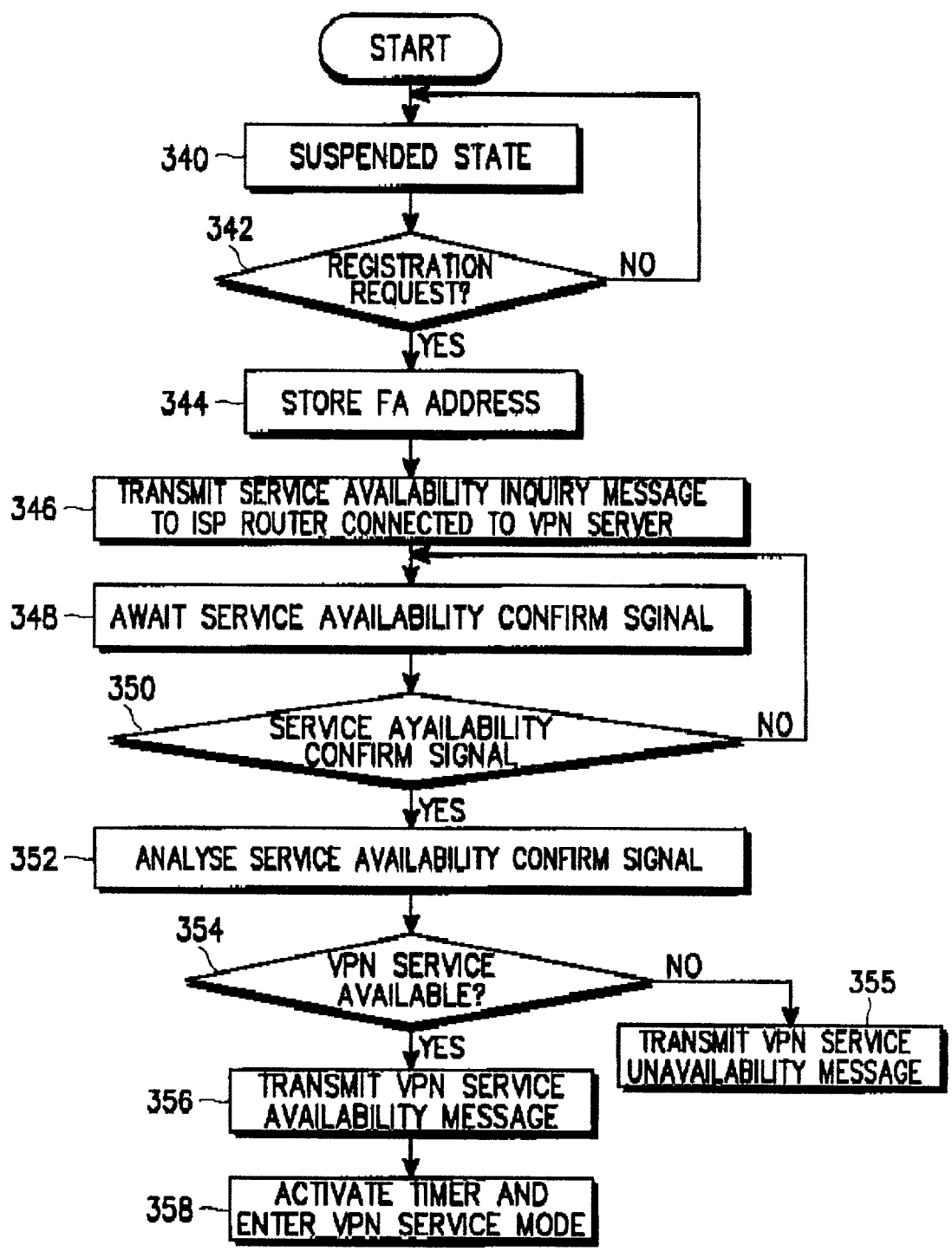
FIG. 15 illustrates a process for receiving the location registration request signal for the VPN service from the MN at the HA according to an embodiment of the present invention.

FIG. 15 illustrates a process for receiving the location registration request signal for the VPN service from the MN 10 at the HA 30 according to an embodiment of the present invention. Referring to FIG. 15, the HA 30 maintains the suspended state in step 340, and determines in step 342 whether the location registration request signal for the VPN service is received from the FA 20. Upon receiving the location registration request signal for the VPN service, the HA 30 stores the address of the FA 20 where the MN 10 is located, in step 344. That is, the HA 30 stores the address of the FA 20 included in the message transmitted from the FA 20 in step 324 of FIG. 14. In step 346, the HA 30 creates a service availability inquiry message for inquiring whether a service to the second ISP router 140 connected to the VPN server 50 is available, and transmits the created service availability inquiry message to the second ISP router 140. The created service availability inquiry message includes the address of the FA 20 and the data from the MN 10.

After transmitting the service availability inquiry message, the HA 30 awaits a service availability confirm signal in step 348, and determines in step 350 whether the service availability confirm signal is received from the VPN server 50. Upon receiving the service availability confirm signal from the VPN server 50, the HA 30 analyzes the received service availability confirm signal in step 352, and then determines in step 354 whether the VPN service is available. As the result of the message analysis, if the VPN service is available, the HA 30 proceeds to step 356. Otherwise, if the VPN service is unavailable, the HA 30 transmits a VPN service unavailability message to the FA 20 in step 355. When transmitting the VPN service unavailability message, the HA 30 does not register the VPN service. In step 356, the HA 30 creates a VPN service availability message and transmits the created VPN service availability message to the FA 20. The VPN service availability message is transmitted along with the address of the second ISP router 140. In step 358, the HA 30 activates a timer and enters the VPN service mode. In the VPN service mode, the HA 30 blocks the data received from the CN 40, which is another Internet terminal or a server. Activating the timer is to set a time period for which the MN 10 is located in the FA 20. It is optional whether to activate the timer. That is, it is also possible not to activate the timer.

Figure 16:
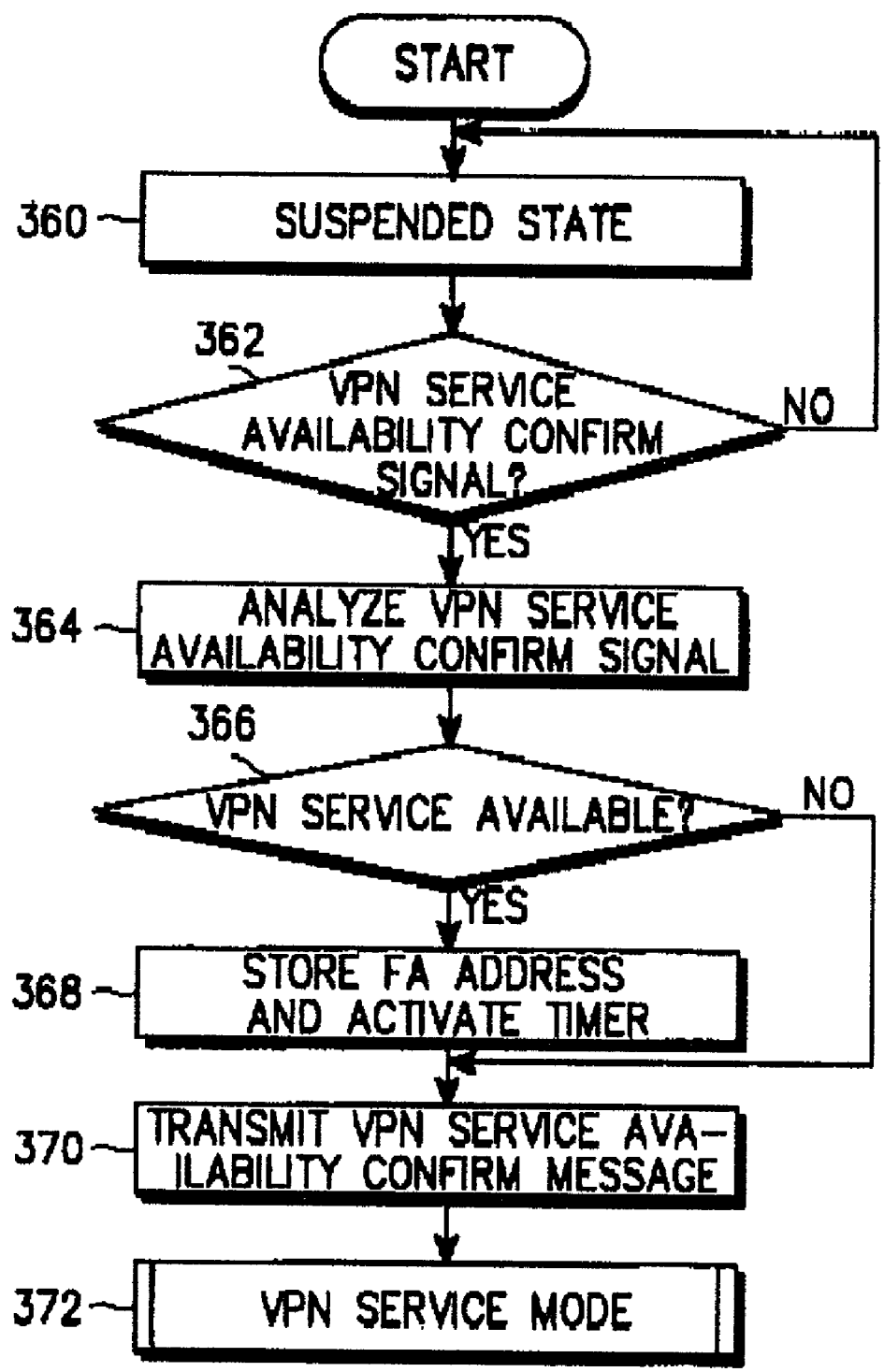
FIG. 16 illustrates an operation of the VPN server performed in reply to the VPN service request from the MN according to an embodiment of the present invention.

FIG. 16 illustrates an operation of the VPN server 50 performed in reply to the VPN service request from the MN 10 according to an embodiment of the present invention. Referring to FIG. 16, the VPN server 50 maintains the suspended state in step 360, and determines in step 362 whether the VPN service availability confirm signal is received. Upon receiving the VPN service availability confirm signal, the VPN server 50 analyzes the received VPN service availability confirm signal in step 364, and then determines in step 366 whether the MN 10 is a registered MN and the current system can accommodate the VPN service. That is, the VPN server 50 determines whether the MN 10 can perform the VPN service. As the result of the analysis, if the VPN service is available, the VPN server 50 detects an FA address from the received VPN service availability confirm signal, stores the detected FA address, and activates a timer for limiting a time period required for storing the FA address, in step 368. Optionally, the timer can be included or not included in the VPN server 50. In step 370, the VPN server 50 creates a VPN service availability confirm message and transmits the created VPN service availability confirm message. In step 372, the VPN server 50 transitions to a VPN service state where it can perform the VPN service on the MN 10. However, if the VPN service is unavailable in step 366, the VPN server 50 jumps to step 370. In an alternative embodiment, however, if the VPN service is unavailable, the VPN server 50 may avoid transmitting the VPN service availability confirm message. In this case, upon failure to receive a reply signal within a predetermined time, the HA 30 can consider that the VPN service is unavailable.

Figure 17:
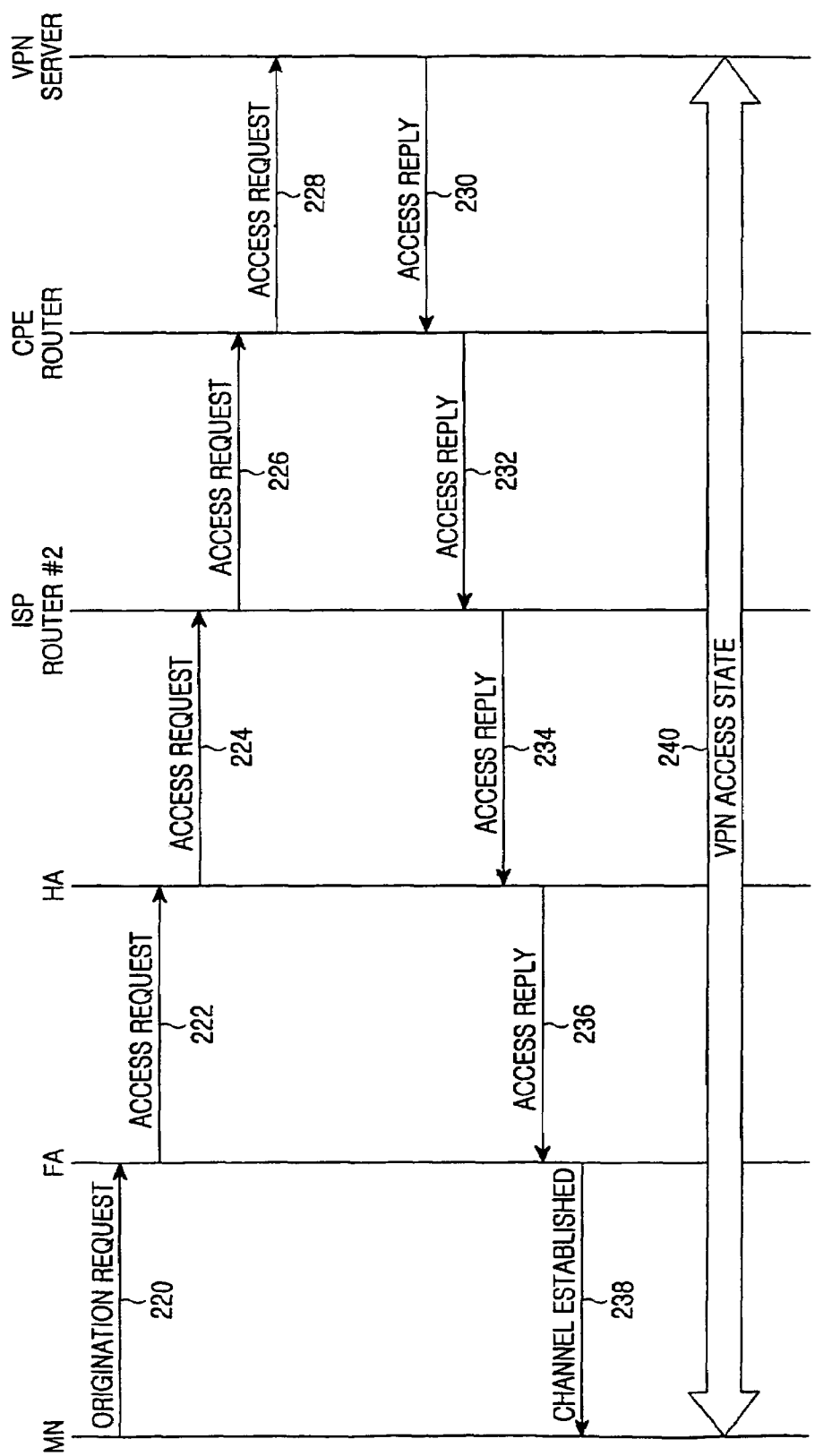
FIG. 17 illustrates a signal flow at each mode in the case where the MN requests the VPN service.

FIG. 17 illustrates a signal flow at each mode in the case where the MN 10 requests the VPN service. Referring to FIG. 17, if the MN 10 sends a call origination request to the FA 20 in step 220, the FA 20 determines whether the call origination request is a VPN service request. As the result of the determination, if the call origination request is the VPN service request, the FA 20 transmits an access request signal to the HA 30 through the first ISP router 120, in step 222. At the same time, the FA 20 transmits the call origination signal to the first ISP router 120 along with an address of the second ISP router 140 as well as a VPN-ID of the MN 10 and an address of the VPN server 50. The first ISP router 120 then transmits an access request signal to the VPN server 50 through the second ISP router 140, using the address of the second ISP router 140. Upon receiving the access request signal to the VPN server 50 from the HA 30 in step 224, the second ISP router 140 transmits the access request signal to the CPE router 160 in step 226. The CPE router 160 then transmits the access request signal to the VPN server 50 in step 228. Through this process, the access request signal is transmitted to the VPN server 50.

The VPN server 50 then determines whether the service is accessible. If the service is accessible, the VPN server 50 transmits an access reply signal to the CPE router 160 in step 230. The CPE router 160 transmits the access reply signal to the second ISP router 140 in step 232. Since the second ISP router 140 has received data from the first ISP router 120, it forms an IP tunnel and transmits the access reply signal through the IP tunnel in step 234. The first ISP router 120 then transmits the access reply signal to the FA 20 in response to the received access reply signal, in step 236. Upon receiving the access reply signal in this process, the FA 20 establishes a channel to the MN 10 in step 238. When the channel is established, the VPN access state is maintained in step 240.

Figure 18:
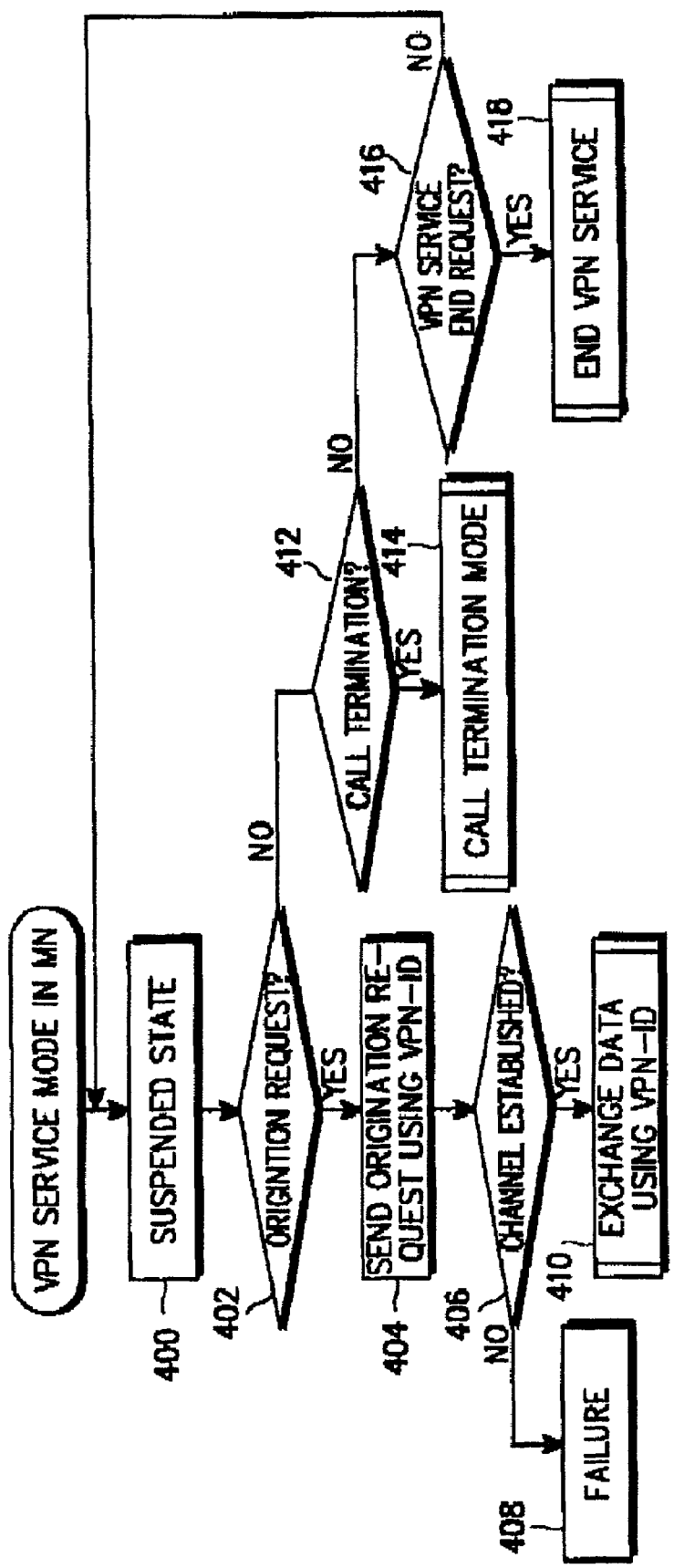
FIG. 18 illustrates an operation of the MN in the VPN service mode after VPN location registration according to an embodiment of the present invention.

FIG. 18 illustrates an operation of the MN 10 in the VPN service mode after VPN location registration according to an embodiment of the present invention. Referring to FIG. 18, the MN 10 maintains the suspended state in step 400, and determines in step 402 whether a call origination request for the VPN service is received. Upon receiving the call origination request for the VPN service, the MN 10 transmits a call origination request signal using the VPN-ID received in the location registration process, in step 404. At this moment, the MN 10 creates data of the second ISP router 140 and information on the VPN server 50, and transmits the created data along with the call origination request signal. The MN 10 determines in step 406 whether a channel is established. As the result of the determination, if the channel is established, the MN 10 exchanges data using the VPN-ID, in step 410. That is, the MN 10 performs the VPN service. However, if the channel is not established, the MN 10 performs a call failure process in step 408. In an alternative embodiment, if the channel is established after an authentication signal is received, the MN 10 establishes the channel after the authentication process.

However, upon failure to receive the call origination request in step 402, the MN 10 determines in step 412 whether a termination call is received. Upon receiving a termination call, the MN 10 performs a call termination mode in step 414, since the current state is registered in the VPN service. However, upon failure to receive the termination call in step 412, the MN 10 determines in step 416 whether a VPN service end request is received. Upon receiving the VPN service end request, the MN 10 performs a VPN service end process in step 418. The VPN service end process can be implemented by creating a general location registration message to re-perform the location registration or defining a VPN withdraw message. As a result, the HA 30 can enter an Internet service mode by releasing the VPN service mode.

Figure 19:
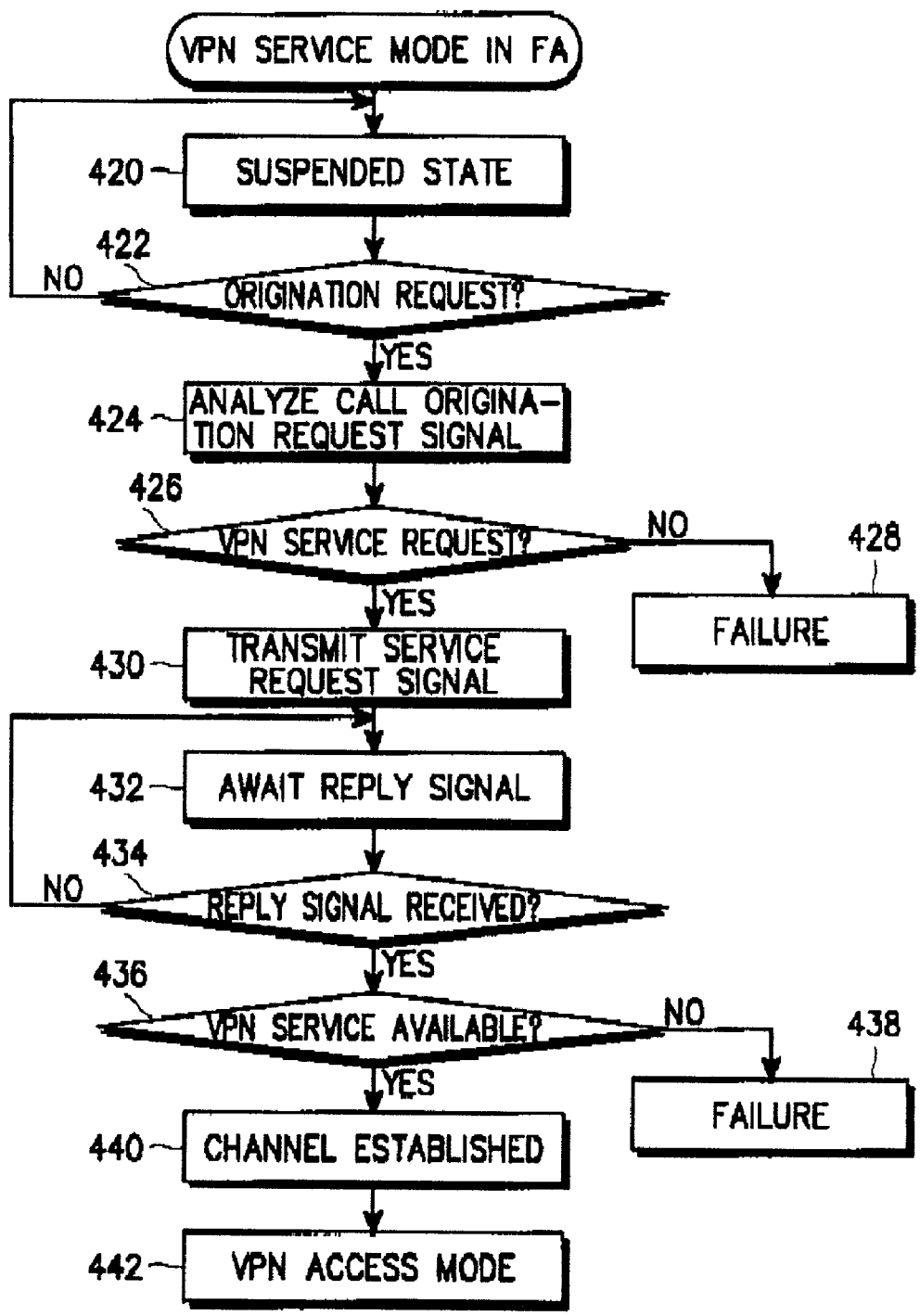
FIG. 19 illustrates a process for receiving a call origination request for the VPN service from the MN at the FA in the VPN service mode according to an embodiment of the present invention.

FIG. 19 illustrates a process for receiving the call origination request for the VPN service from the MN 10 at the FA 20 in the VPN service mode according to an embodiment of the present invention. Referring to FIG. 19, the FA 20 maintains the suspended state in step 420, and determines in step 422 whether a call origination request signal is received from the MN 10. Upon receiving the call origination request signal, the FA 20 analyzes the received call origination request signal in step 424. In this state, if the MN 10 is registered in the VPN service, the FA 20 proceeds to step 426. However, if the MN 10 is not registered in the VPN service, the FA 20 analyzes the type of the requested service and sends the results to the HA 30, performing the process beginning at the service request step. In the following description, it will be assumed that the MN 10 is registered in the VPN service. If the received service request is a VPN service request, the FA 20 processes to step 430. Otherwise, the FA 20 proceeds to step 428 where it performs a VPN service failure process. In step 430, the FA 20 transmits the service request signal to the first ISP router 120.

At this moment, the FA 20 transmits an address of the VPN server 50 and an address of the second ISP router 140, stored during the VPN location registration, along with the service request signal.

After transmitting the service request signal, the FA 20 awaits arrival of a reply signal from the VPN server 50 in step 432. Though not illustrated in FIG. 19, upon failure to receive the reply signal within a predetermined time, the FA 20 can perform a failure process. The FA 20 determines in step 434 whether the reply signal is received. Upon receiving the reply signal, the FA 20 determines in step 436 whether the VPN service is available. That is, the FA 20 analyzes the received message and determines whether the message is received in a serviceable state. As the result of the analysis, if the received message is serviceable, the FA 20 proceeds to step 440, and otherwise, proceeds to step 438. In step 438, the FA 20 informs the MN 10 of a service failure.

In step 440, the FA 20 establishes a channel, i.e., connects a channel for the VPN service, thus forming a channel for data exchange between the FA 20 and the MN 10. In step 442, the FA 20 enters the VPN access mode in which the FA 20 transmits the data received from the MN 10 to the VPN server 50 and transmits the data received from the VPN server 50 to the MN 10.

Figure 20:
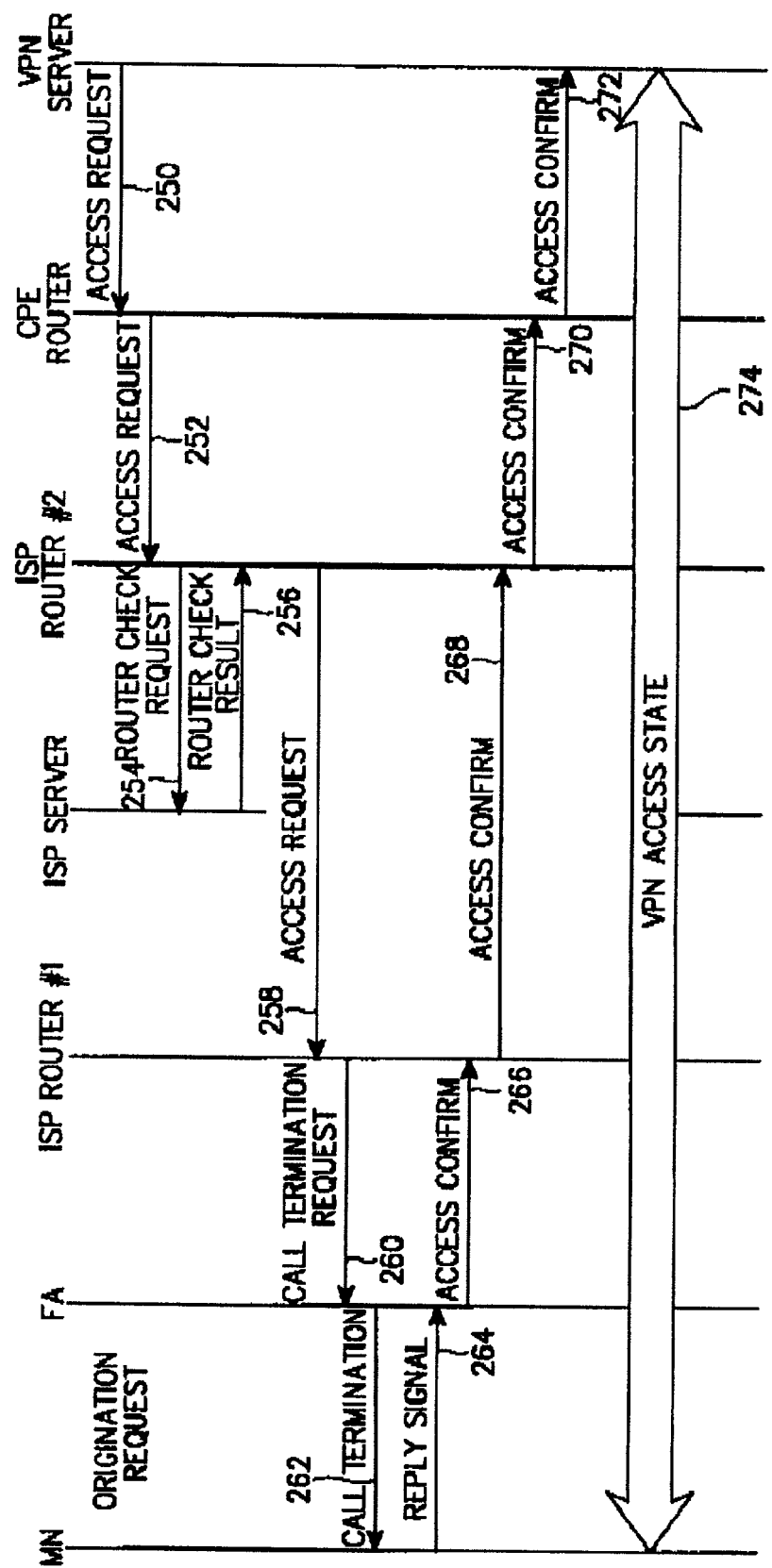
FIG. 20 illustrates a signal flow at each node in the case where a call access request is transmitted from the VPN server to the MN after the VPN location registration, according to an embodiment of the present invention.

FIG. 20 illustrates a signal flow at each node in the case where a call access request is transmitted from the VPN server 50 to the MN 10 after the VPN location registration, according to an embodiment of the present invention. Referring to FIG. 20, the VPN server 50 sends an access (or connection) request signal to the CPE router 160 in order to send a location registration request to the MN 10, which has performed the VPN location registration. Thus, the VPN server 50 recognizes an address of the FA 20. Therefore, the access request signal includes a temporarily assigned VPN-ID of the MN 10, an MIN of the MN 10 and the address of the FA 20. Upon receiving the access request signal, the CPE router 160 transmits the received access request signal to the second ISP router 140, an edge ISP router in the same network, in order to transmit data to the IP network.

Upon receiving the access request signal, the second ISP router 140 sends a router check request to the ISP server 180 in step 254, in order to search an ISP router of the IP network where the FA 20 is located. In this case, the address transmitted from the second ISP router 140 to the ISP server 180 becomes the address of the FA 20. The ISP server 180 then checks an address of the first ISP router 120 using the address of the FA 20, and sends the checked address of the first ISP router 120 to the second ISP router 140 in step 256. The second ISP router 140 transmits an access request signal to the first ISP router 120 using the received checked address, in step 258.

The transmitted access request signal can include such data as an address of the FA 20, a VPN-ID of the MN 10 and an MIN of the MN 10. The first ISP router 120 transmits a call termination request signal to the FA 20 using the address of the FA 20 among the received data, in step 260. The FA 20 then sends a call termination signal to the MN 10 in step 262. If a user of the MN 10 inputs a specific key in response to the call termination signal, i.e., answers the termination call, then the MN 10 sends a reply signal to the FA 20 in step 264. The FA 20 then transmits an access confirm signal to the first ISP router 120 in step 266. The first ISP router 120 then transmits an access confirm signal to the second ISP router 140 in step 268. Through this process, an IP tunnel is formed between the first ISP router 120 and the second ISP router 140. In step 270, the second ISP router 140 sends the received access confirm signal to the CPE router 160. In step 272, the CPE router 160 sends the access confirm signal to the VPN server 50. Through this process, a channel for data exchange between the VPN server 50 and the MN 10 is formed. When the channel is established, the VPN access state is maintained in step 274.

As described above, the present invention performs the VPN service by assigning a mobile IP to a mobile node (MN). In addition, it is also possible for the VPN network to accommodate the MN.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for providing a VPN (Virtual Private Network) service by connecting a VPN to a mobile communication network, comprising:
   a home agent (HA) in which location information of a mobile node (MN) and information about the VPN service for the MN are stored when the HA receives from the MN, a location registration request message for the VPN service;
   a foreign agent (FA) for receiving location registration information from the MN, transmitting a location registration request message to the HA, receiving information about the VPN service from the HA and transmitting data to an ISP (Internet Service Provider) router in a same network as that of the FA, when receiving a VPN service request;
   an ISP server positioned between the ISP router of the FA network and an ISP router of the VPN, for managing information on the ISP routers and establishing IP tunneling between the ISP routers;
   a router network for routing between the FA network and the VPN and for receiving and transmitting the data using an IP tunnel to a correspondence node; and
   a VPN server connected to the ISP router of the VPN, for providing the VPN service.

2. The system as claimed in claim 1, wherein the ISP server searches the ISP router of the FA network using an address of the FA.

3. The system as claimed in claim 1, wherein the HA prevents the MN from accepting a call request received from a specific node in an IP network while the MN is performing the VPN service.

4. The system as claimed in claim 1, wherein the MN transmits an address of the HA and an address of the VPN server to the FA during VPN registration, and performs the VPN service by receiving a temporary ID for use of the VPN from the FA during the location registration.

5. The system as claimed in claim 1, wherein the MN stores the address of the VPN server and an address of a router in the network, received from the FA, and performs the VPN service using the received addresses.

6. A method for providing a VPN (Virtual Private Network) service to an MN (Mobile Node) located in an FA (Foreign Agent) network, connected to the MN, comprising the steps of:
   managing in an ISP (Internet Service Provider) server information on ISP routers for establishing an IP (Internet Protocol) tunnel between an ISP router in the FA network and an ISP router of the VPN;
   upon receiving a location registration request message for the VPN service from an FA in an HA (Home Agent), storing an address of the FA connected to the MN in the HA, wherein the HA further comprises information about the VPN service for the MN;
   receiving information about the VPN service from the HA in the FA in response to the reception of the location registration request message by the HA;
   establishing an IP tunnel between the ISP router in the FA network and the ISP router of the VPN; and
   receiving and transmitting data from/to the VPN for performing the VPN service using the IP tunnel.

7. The method as claimed in claim 6, further comprising blocking an Internet service when being in a VPN service state.

8. The method as claimed in claim 6, further comprising transmitting a location registration failure message for the VPN service upon failure to receive a reply signal within a time period after transmitting the location registration request message.

9. The method as claimed in of claim 6, further comprising activating a timer for a time period when the VPN service is available and performing a VPN service mode.

10. The method as claimed in of claim 6, further comprising transmitting from the MN an address of the HA and an address of the VPN server to the FA during VPN registration, and performing the VPN service by receiving a temporary ID for use of the VPN from the FA during the location registration in the MN.

11. The method as claimed in of claim 6, further comprising storing the address of the VPN server and an address of a router in the network received from the FA in the MN, and performing the VPN service using the received addresses.

* * * * *